(12) United States Patent
Chen et al.

(10) Patent No.: US 10,474,038 B2
(45) Date of Patent: Nov. 12, 2019

(54) METHOD, SYSTEM, AND STORAGE MEDIUM FOR RESOLVING COLORING CONFLICT IN MULTI-PATTERNING LITHOGRAPHY

(71) Applicant: TAIWAN SEMICONDUCTOR MANUFACTURING COMPANY LTD., Hsinchu (TW)

(72) Inventors: Bo-Yang Chen, Hsinchu (TW); Chi-Chun Fang, Hsinchu (TW); Wai-Kei Mak, Hsinchu (TW); Ting-Chi Wang, Hsinchu (TW)

(73) Assignee: TAIWAN SEMICONDUCTOR MANUFACTURING COMPANY LTD., Hsinchu (TW)

(*) Notice: Subject to any disclaimer, the term of this patent is extended or adjusted under 35 U.S.C. 154(b) by 74 days.

(21) Appl. No.: 15/714,141

(22) Filed: Sep. 25, 2017

(65) Prior Publication Data

US 2019/0094709 A1 Mar. 28, 2019

(51) Int. Cl.
*G06F 17/50* (2006.01)
*G03F 7/20* (2006.01)
*G03F 1/70* (2012.01)
*H01L 27/02* (2006.01)
*H01L 27/118* (2006.01)

(52) U.S. Cl.
CPC .......... *G03F 7/70433* (2013.01); *G03F 1/70* (2013.01); *G06F 17/5081* (2013.01); *H01L 27/0207* (2013.01); *H01L 27/11807* (2013.01); *G06F 2217/12* (2013.01)

(58) Field of Classification Search
CPC ............. G06F 17/5081; G06F 2217/12; G06F 17/5072; G06F 17/50; G06F 2217/06; G06F 17/5045; G03F 1/70; G03F 7/70466; G03F 1/36; G03F 7/70433; G03F 7/70; G03F 7/70283; G03F 1/144; H01L 23/528; H01L 27/0207; H01L 23/5226; H01L 21/027
USPC ......... 716/50–55, 118–119, 122, 139; 430/5, 430/30
See application file for complete search history.

(56) References Cited

U.S. PATENT DOCUMENTS

| 8,209,656 B1 * | 6/2012 | Wang | G03F 1/70 716/118 |
| 9,158,885 B1 * | 10/2015 | Gray | G03F 7/70433 |
| 2018/0032661 A1 * | 2/2018 | Chen | G06F 17/5081 |

* cited by examiner

*Primary Examiner* — Nghia M Doan
(74) *Attorney, Agent, or Firm* — WPAT, P.C., Intellectual Property Attorneys; Anthony King

(57) ABSTRACT

A method performed by at least one processor includes: accessing a layout of an integrated circuit (IC), where the layout includes a plurality of patterns in one or more layers of the layout; performing a coloring operation; forming a list comprising at least one uncolorable cell group (UCG) of the layout based on a result of the coloring operation, where each of the at least one UCG comprises at least one uncolorable cell; and performing a first refinement for each UCG on the list. The first refinement is performed through: performing a movement on at least one uncolorable cell of the UCG; determining whether the UCG is colorable; and refining the layout by accepting the movement and removing the UCG from the list in response to the UCG being determined to be colorable.

20 Claims, 12 Drawing Sheets

METHOD, SYSTEM, AND STORAGE MEDIUM FOR RESOLVING COLORING CONFLICT IN MULTI-PATTERNING LITHOGRAPHY

BACKGROUND

In advanced semiconductor fabrication technologies, the photoresist resolution performance is constrained from improving beyond the 22-nm node due to the lithographic limitations of available fabrication technologies and equipment. However, efforts have been made to extend the life cycle of purchased fabrication equipment in order to facilitate development processes and reduce expenditure. Multi-patterning lithography methods are commonly discussed among the alternative solutions.

Multi-patterning lithography (MPL) involves exposing lithographic patterns on a single layer of a substrate using two or more different masks. Different masks are used sequentially to pattern the same layer. The circuit features on each mask are designed to comply with the requirement for relevant minimum separation distance. As a result, the combined circuit layout formed using the multiple masks may generate a smaller feature spacing than the minimum separation distance predetermined for the single-patterning approach. The effective feature pitch can be shrunk further in a cost-efficient way without deteriorating chip performance.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
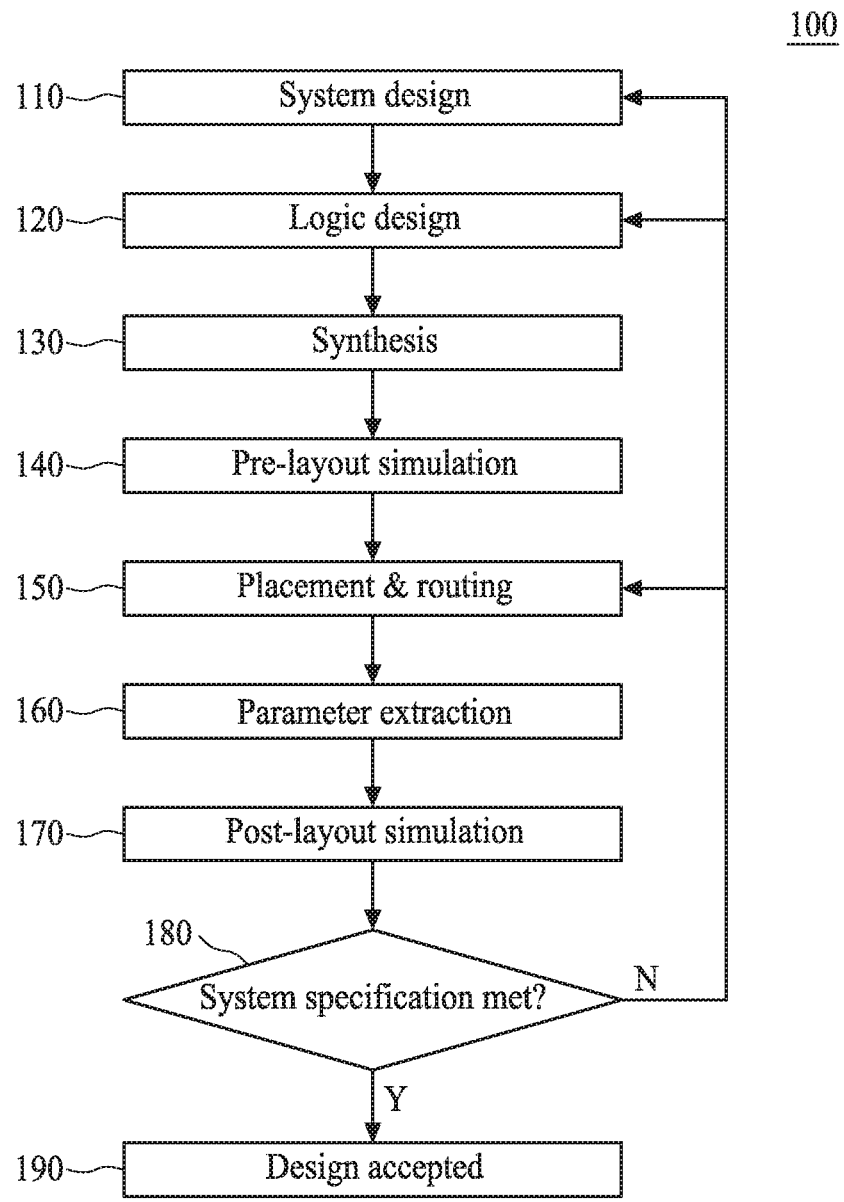
FIG. 1 is a schematic diagram illustrating a design flow of a layout of an integrated chip (IC), in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The term "coloring" used throughout the present disclosure refers to an intermediate step in the automatic placing and routing operation of a layout. A single lithography mask of layer in a layout is split into several masks and the circuit patterns of the masks are assigned corresponding mask colors in the visualized layout drawings. In performing the coloring operation, it is usually required to comply with the minimum separation distance rule between adjacent circuit patterns. The coloring operation may be deemed successful or unsuccessful depending on whether each of the circuit patterns is assigned a proper mask (i.e., color) to meet the minimum separation distance rule.

The term "colored" used throughout the present disclosure refers to a layout subjected to a coloring operation. In some situations, a colored layout does not necessarily guarantee all the circuit patterns of the layout are colored successfully after being subjected to the coloring operation.

The term "uncolorable" used throughout the present disclosure refers to a circuit pattern of a colored layout which cannot be assigned any one of the masks while fulfilling the minimum separation distance requirements for the layout. The term "uncolorable" may also refer to a layout that contains at least one uncolorable circuit pattern. In that case, on the visualized layout drawings the uncolorable circuit pattern may be assigned yet another color different from the colors used for the masks. Similarly, the term "coloring conflict" might be used throughout the present disclosure to describe the problem of uncolorable circuit patterns in a coloring operation.

The term "cell" used throughout the present disclosure refers to a group of low-level circuit patterns to implement specific functionalities, such as AND, NAND, XOR, or other features. A cell is usually designed to be optimized in several aspects, such as power, size, and speed, and meets the design criterion, such as the minimum separation distance rule. Thus, circuit designers can benefit from the cells since they can construct a high-level circuit concept and implement the circuit details by taking advantage of the established cells.

Multi-Patterning Lithography (MPL) is a layout mask decomposition technology employing a number, say M, of masks to expose a single layer. For example, if three masks are to be used (i.e., M=3), three colors are used in the colored layout in which each color corresponds to a photomask.

Close features in the layout may be assigned different colors to increase the separation distance among the features. Multiple exposure procedures are applied to expose a single layer using the three masks in succession. Although MPL is employed for assigning different masks to increase the separation distance, a coloring conflict may still exist for a given layout or a layer of the layout when there is no way to assign all the circuit features to the given number of photomasks, without violating the minimum separation distance rule.

In the present disclosure, a cell-based layout refinement scheme is proposed to reduce the number of uncolorable circuit patterns in the MPL framework. All the uncolorable cells containing uncolorable circuit patterns are identified. An uncolorable cell group is introduced for grouping contiguous uncolorable cells. Moreover, a refinement operation targeted at all circuit patterns in the uncolorable cells is performed for all circuit patterns of a UCG. The solution space is enlarged while the search time is kept acceptable to practical cases. The number of uncolorable cells can thus be decreased effectively in an efficient way.

FIG. 1 is a schematic diagram illustrating a design flow 100 of a layout of a semiconductor integrated chip (IC), in accordance with some embodiments. The design flow 100, employed for designing semiconductor chips, utilizes one or more electronic design automation (EDA) tools to perform operations therein. A workstation or personal computer is typically used in executing the tools to accomplish the design flow 100. The design flow 100 comprises a system design stage 110, a logic design stage 120, a synthesis stage 130, a pre-layout simulation stage 140, a placement and routing development stage 150, a parameter extraction stage 160 and a post-layout simulation stage 170.

Initially, at the system design stage 110, a systematic architecture for the chip of interest is provided with a high-level description. At stage 110, the chip functions along with performance requirements are determined according to a design specification. The chip functions are usually represented by respective schematic functional modules or blocks. In addition, an optimization or performance trade-off may be sought to achieve the design specification with affordable cost and power.

At the logic design stage 120, the functional modules or blocks are described in a register transfer level (RTL) using a hardware description language. Commercially available language tools are generally used, for example, Verilog or VHDL. In an embodiment, a preliminary functionality check is performed at stage 120 to verify if the implemented functions conform to the specification set forth in stage 110.

Subsequently, at the synthesis stage 130, the modules in RTL descriptions are converted into a netlist data where the circuit structure, e.g., logic gates and registers, of each function module are established. In some embodiments, technology mapping of logic gates and registers to available cells in the standard cell libraries are conducted. Further, the netlist data is offered to describe the functional relationship of the chip in a gate level. In an embodiment, the netlist data is transformed from the gate-level view to a transistor-level view.

Subsequently, the gate-level netlist data is verified at the pre-layout simulation stage 140. During the verification process of stage 140, if some of the functions fail the verification in the simulation, the design flow 100 may be paused temporarily or may go back to stage 110 or 120 for further modification. After the pre-layout simulation stage 140, the chip design has passed a preliminary verification and completed the front-end design process. Consequently, a back-end physical design process follows.

At the placement and routing stage 150, a physical architecture representing the chip determined during the front-end process is implemented. The layout development involves a placement operation and a routing operation in series. Detailed structure and associated geometry for the components of the chip are determined in the placement operation. Interconnects among different components are routed subsequent to the placement operation. Both placement and routing operations are performed to meet a design rule check (DRC) deck so that the manufacturing requirement of the chip is fulfilled. In an embodiment, the DRC deck includes a minimum separation distance rule for the discrete elements. In an embodiment, MPL is employed in which different masks are leveraged in constructing the placed and routed layout to meet the minimum separation distance rule. Once the stage 150 is completed, a placed-and-routed layout is created and a netlist along with data on placement and routing is generated accordingly.

At the parameter extraction stage 160, a layout parameter extraction (LPE) operation is conducted to derive layout-dependent parameters, such as parasitic resistance and capacitance, resulting from the layout developed in stage 150. Consequently, a post-layout netlist data is then generated, which includes the layout-dependent parameters.

At the post-layout simulation stage 170, a physical verification is performed taking into consideration the parameters acquired in previous stages. A simulation of transistor-level behavior is conducted to examine whether the chip performance meets the required system specifications. In some embodiments, the post-layout simulation is performed to minimize possibilities of electrical issues or lithographic issues during the chip manufacturing process.

Next, it is determined during stage 180 whether the post-layout netlist meets the design specifications. If affirmative, the circuit design is accepted at stage 190 and then signed off accordingly. The chip is manufactured according to the accepted post-layout netlist. However, if the result of the post-layout simulation is unfavorable, the design flow 100 loops back to previous stages for tuning functionalities or structures. For example, the design flow 100 may loop back to stage 150 where the layout is re-developed to fix issues from a physical perspective. Alternatively, the design flow 100 may retreat to an earlier stage 110 or 120 to recast the chip design from a functional level in case the problems cannot be resolved within the back-end process.

The design flow 100 illustrated in FIG. 1 is exemplary. Modifications of the above-mentioned stages, such as change of order for the stages, partition of the stages, and deletion or addition of stages, are within the contemplated scope of the present disclosure.

Figure 2:
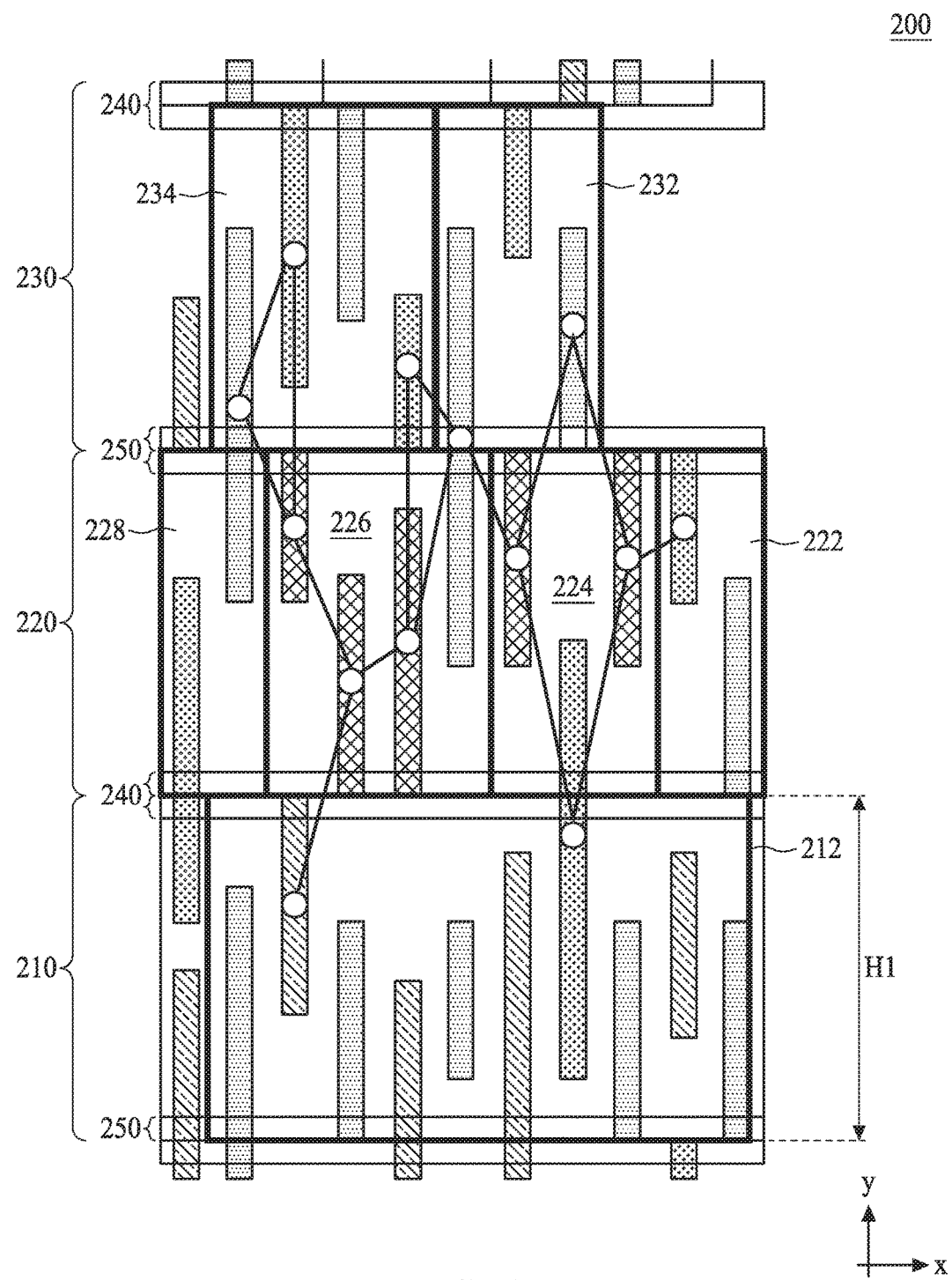
FIG. 2 is a schematic layout diagram in accordance with some embodiments.

FIG. 2 is a schematic layout diagram 200, in accordance with some embodiments. The layout 200 may be an exemplary layer of a multi-layer layout. In an embodiment, the layout 200 includes multiple rows arranged in parallel. In the depicted embodiment, the layout 200 includes three rows 210, 220 and 230. In an embodiment, the rows 210, 220 and 230 have an equal height H1. Moreover, a cell 212 is placed in the row 210, four cells 222, 224, 226 and 228 are placed in order in the row 220, and cells 232 and 234 are placed in the row 230. In the depicted embodiment, each cell may have a same height equal to the row height H1. In alternative embodiments, a cell may have a cell height of a multiple of row height H1, e.g., 2×H1. Each cell may include features or circuit patterns, as represented by rectangular patterns in the cells. In an embodiment, each cell may include two basic patterns, e.g., a first pattern 240 and a second pattern 250, among all patterns. The patterns 240 and 250 are disposed on a top side and a bottom side of a cell, respectively, or vice versa. The patterns 240 and 250 may serve as a power rail or a ground rail of the respective cell. The pattern 240 or 250 of one cell may be laterally connected to another pattern 240 or 250 in an adjacent cell. As a result, the power rails or ground rails of interconnected cells on the same row extend along the direction of the x-axis. In an embodiment, the interconnected power rail or ground rail is electrically coupled to a power terminal or a ground terminal of the chip. The initial cell arrangement of the layout 200 may correspond to an initial placement in stage 150 of FIG. 1. The layout 200 may be changed in subsequent operations due to a detected coloring conflict among the cells.

Figure 3:
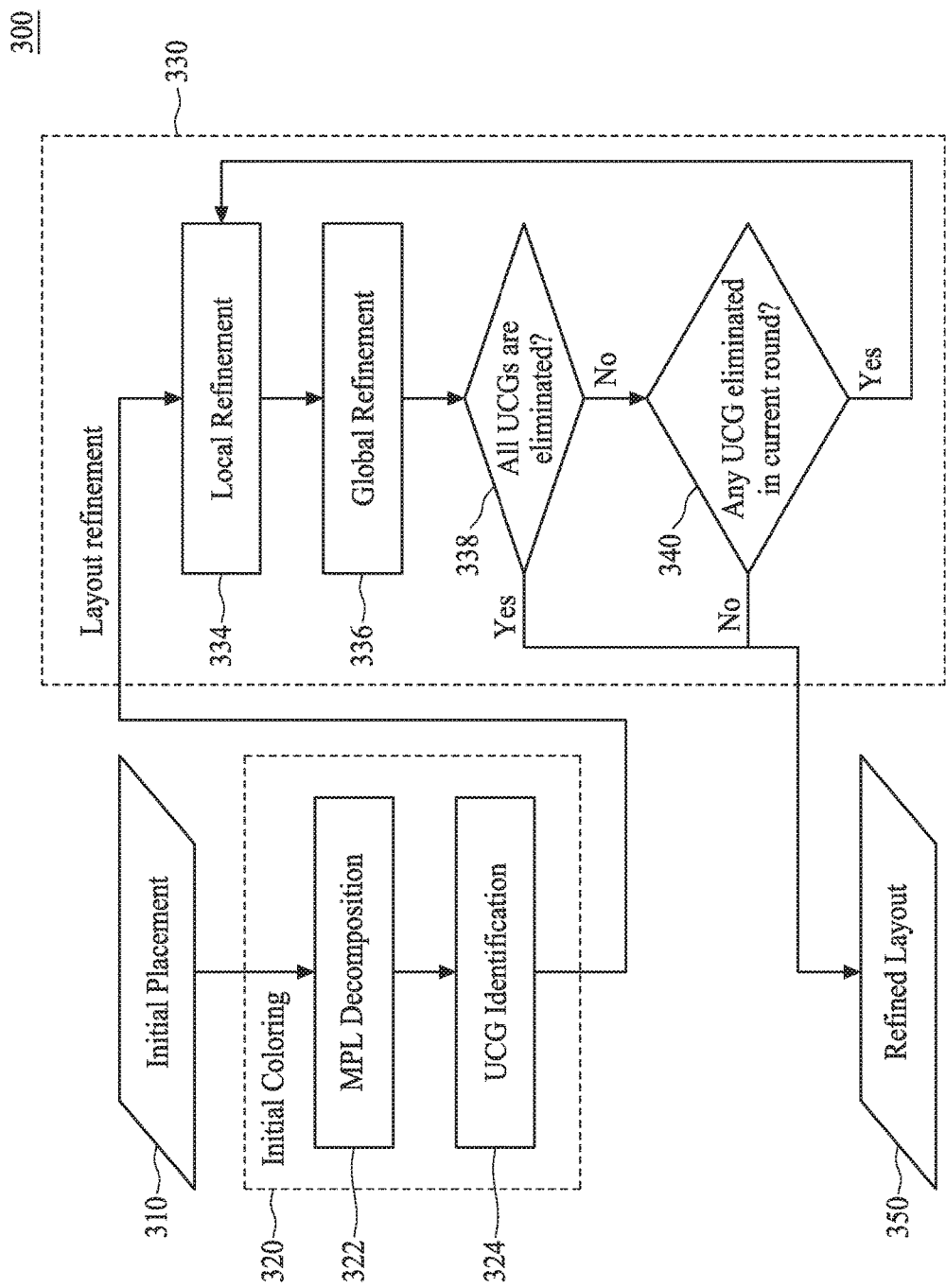
FIG. 3 is a design flow of coloring conflict resolution in accordance with some embodiments.

FIG. 3 is a design flow 300 of coloring conflict resolution in accordance with some embodiments. The design flow 300 includes a step 310 of initial placement, a block 320 of initial coloring, a block 330 of layout refinement, and a step 350 of refined layout output.

Initially, at step 310, a layout is received or provided with a preliminary placement configuration, e.g., layout 200 as illustrated in FIG. 2. Next, the design flow 300 proceeds with the block 320 that includes a step 322 of multiple patterning lithography (MPL) and a step 324 of UCG identification. At step 322, an MPL decomposition operation is performed to assign circuit patterns of the layout with different masks. Once the layout is colored in step 322, both of colorable and uncolorable circuit patterns are recognized. As discussed previously, the layout is usually assembled with cells. Although each cell may meet the minimum separation distance rule for the circuit patterns within them, the spacing between circuit patterns at the boundary of different cells may violate the minimum separation distance rule. Such violation may occur to neighboring cells from the same or from different rows of a layer. Moreover, such violation may occur to neighboring cells from the same or from different layers of a layout.

At step 324, uncolorable cells are identified. A cell in the layout 200 is identified as an uncolorable cell (UCC) that includes at least one uncolorable circuit pattern. An uncolorable cell group (UCG) is identified that refers to a union of UCCs in which one UCC abuts at least another UCC in the UCG. For example, in the layout 200, the cells 224 and 226 may form a UCG if they are identified as UCCs, but cells 224 and 234 can form a UCG only when the intervening cell 232 or 226 is also found to be a UCC. In an embodiment, different UCGs may overlap. In an embodiment, different UCGs may share at least one common UCC. An uncolorable layout may include more than one UCG. In some embodiments, an uncolorable layout with multiple layers may include a UCG formed of UCCs from different layers. A list of the identified UCGs is fed to block 330.

The flow 300 further proceeds with the block 330 of layout refinement operations, in which coloring conflicts among the UCGS may be resolved. The block 330 includes a step 334 for local refinement and a step 336 for global refinement. All UCGs are processed in succession in the local refinement step 334. Once the local refinement for all UCGs is finished, remaining UCGs that fail the local refinement are processed in succession in the global refinement step 336. Detailed operations of step 334 are described with reference to FIGS. 6 and 7A through 7D. Detailed operations of step 336 are described with reference to FIG. 8.

At step 338, it is determined whether all UCGs have been eliminated, i.e., removed from the list. If affirmative, that means all color conflicts have been resolved through the layout refinement operation. Thus, the flow 300 proceeds with step 350 in which the refined layout is output. Otherwise, if not all UCGs are eliminated, the flow 300 proceeds with step 340 to check if there is any UCG eliminated in the current round of refinement operation, either in the local refinement step 334 or the global refinement step 336.

If it is determined that at least one USG is eliminated in the current round of refinement operation, the flow 300 returns to step 334 for resuming the layout refinement operations. That is because removal of any UCG may change the coloring conditions of other UCGs. Thus, it is worthwhile to reexamine all currently remaining UCGs once one of the UCG is removed. Otherwise, if no UCG can be further removed in the current round, the layout refinement operation is suspended and the final uncolorable layout is output along with the list of remaining UCGs. In an embodiment, alternative layout tuning approaches that may be beyond the scope of the present disclosure are introduced to fix the unresolved UCGs left in the design flow 300 to achieve a totally colorable layout.

Figure 4:
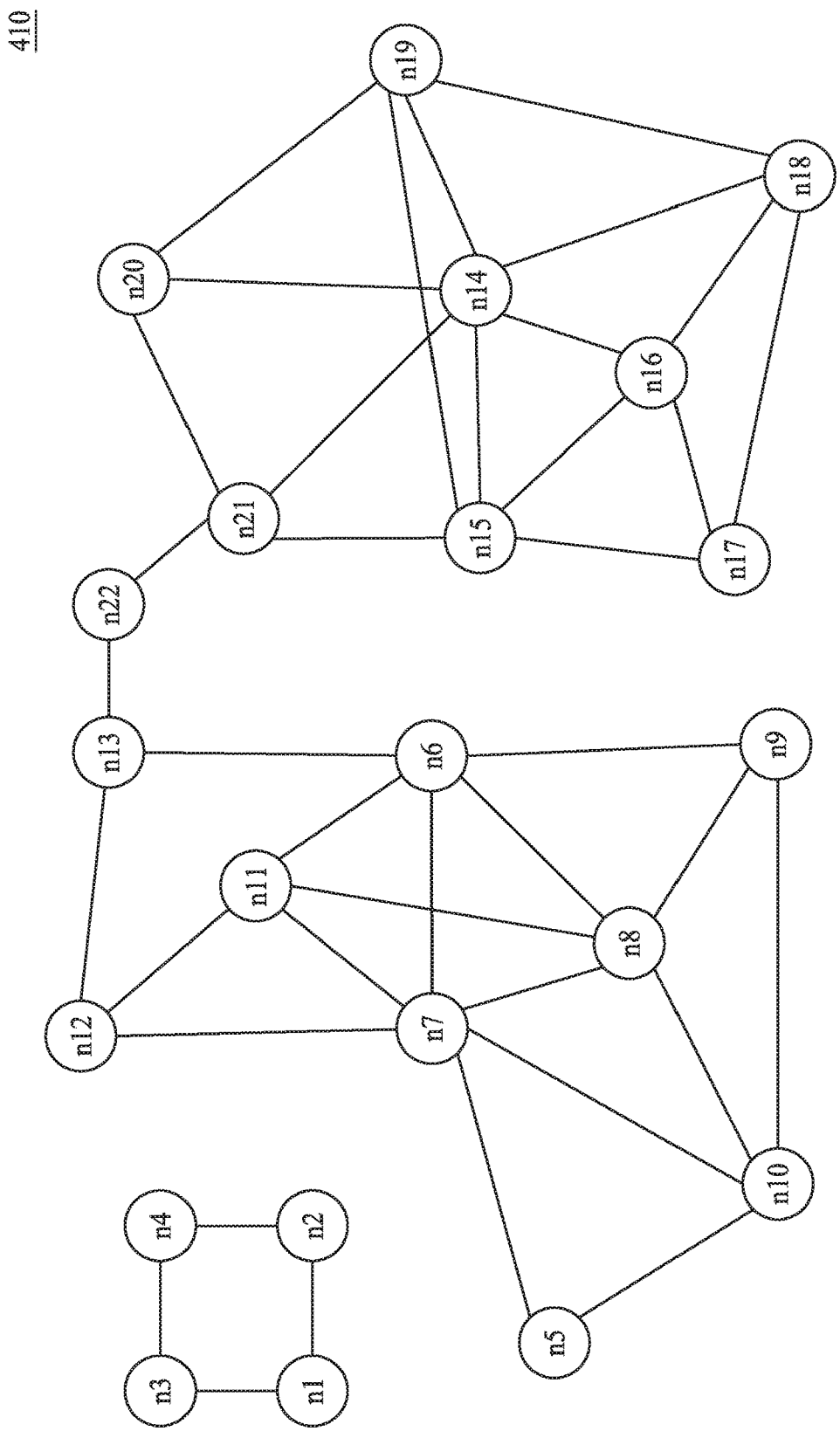
FIGS. 4 and 5 are respective schematic graph diagrams plotted before and after an initial coloring operation, in accordance with some embodiments.
Figure 5:
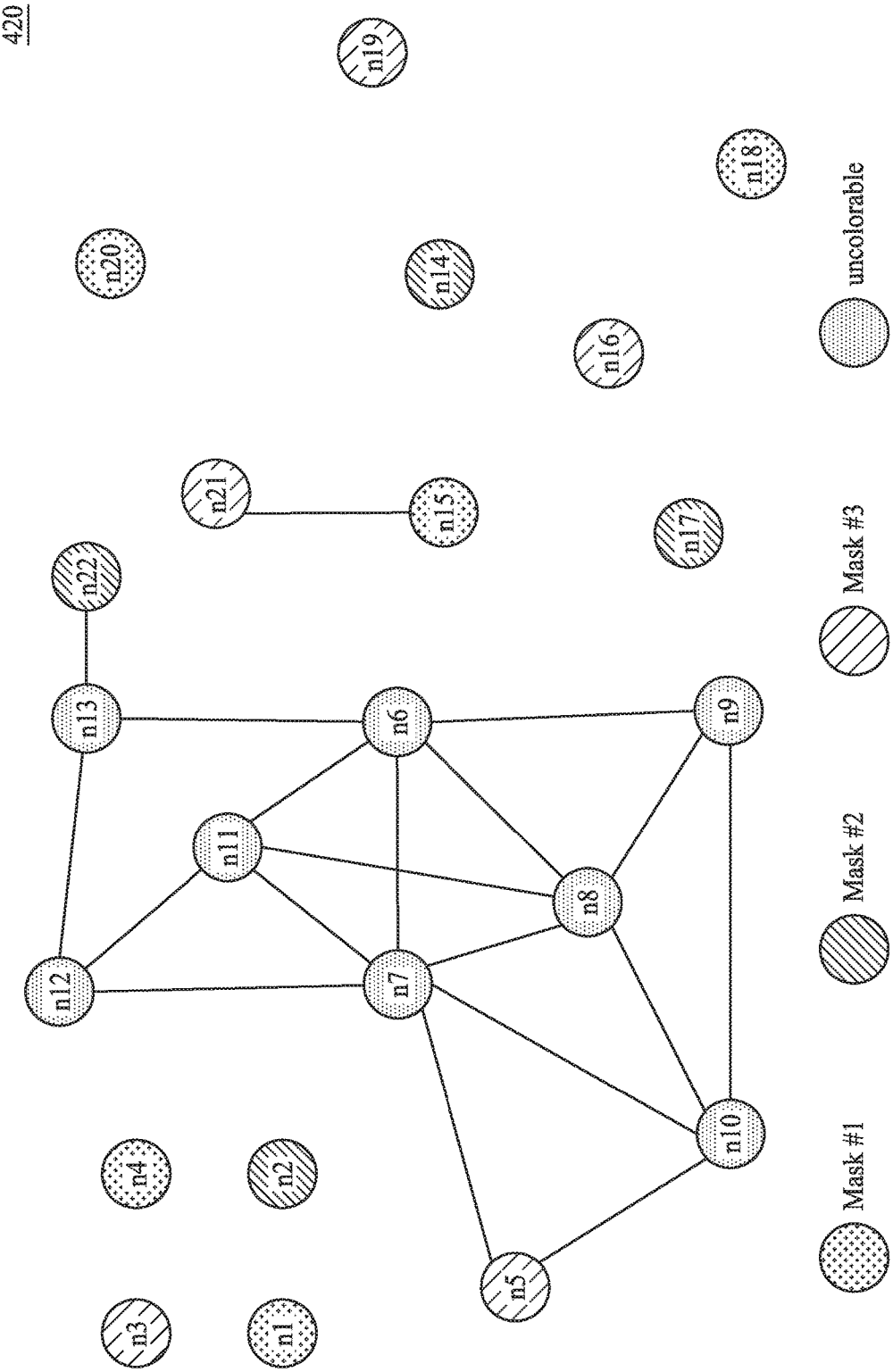

FIGS. 4 and 5 are respective schematic graph diagrams plotted before and after the initial coloring operation in block 320, in accordance with some embodiments. Referring back to FIG. 2, some circuit patterns are plotted along with corresponding nodes. In addition, some of the nodes are interconnected by lines. The nodes and lines form a graph (e.g., graph 410 in FIG. 4) used as an abstract representation of the coloring conflict status. In FIG. 4, a graph 410 including nodes n1 through n22 is shown as corresponding circuit patterns in the layout 200. In an embodiment, two nodes coupled by a connection line represent that circuit patterns corresponding the two nodes fail to meet the minimum separation distance rule. In an embodiment, developed schemes in graph theory may be utilized to resolve the coloring conflict problem of the layout 410, i.e., to remove the connected lines between the nodes.

FIG. 5 shows a completed colored graph 420 through an initial coloring operation. Assume for the sake of discussion the coloring operation adopt three masks. As can be seen in FIG. 5, some nodes are identified as colorable nodes. Nodes n1, n4, n15, n18 and n20 are colored with a first mask, nodes n2, n14, n17 and n22 are colored with a second mask, and nodes n3, n5, n16, n19 and n22 are colored with a third mask. Some other nodes are identified as uncolorable nodes, e.g., nodes n6 through n13.

In some embodiments, a large graph size may cause the coloring task to be very time-consuming. Thus, a graph reduction operation is employed to reduce the graph size, i.e., the number of connected nodes in the graph, during the coloring operation. The final coloring solution to a reduced graph may still be the same as the full graph approach while the computation efforts are reduced significantly. In some embodiments, observing that some subsets of the graph are not connected to each other, the graph is split into several subgraphs and the subgraphs can be colored individually. In an embodiment, a node duplication technique is used to identify a pivot node in a graph that serves as the only node connecting two subsets of the graph. Next, a duplicate of the pivot node is generated such that two sub-pivot nodes are separated and individually connected to corresponding subgraphs in which each subset contains one of the sub-pivot nodes. The coloring operation is performed on the two subsets individually.

In an embodiment, node reduction schemes are utilized such that some nodes are temporally hidden or merged from the graph to facilitate the subsequent coloring operation. A node coloring assignment is performed on the reduced graph of fewer nodes. In an embodiment, a node with degree less than M, that is, the number of lines connected to such node is less than M where the integer M represents the number of masks in the layout, is temporally hidden during the coloring operation. In an embodiment, node clustering technique is used to aggregate nodes that are connected to a same group of nodes of the graph. Some nodes of the colored reduced graph are colorable while some other nodes may be uncolorable. Subsequently, the hidden or merged nodes are returned to their original position along with their connected lines and are colored with appropriate colors. The initial coloring operation is thus finished. The colored graph 420 is mapped to the layout 200. UCCs are labelled based on the coloring information and UCGs are identified accordingly. For example, referring to FIG. 2, cell 224 and 226 may be identified as UCCs due to close circuit patterns near the cell boundary, and are grouped into one UCG.

Figure 6:
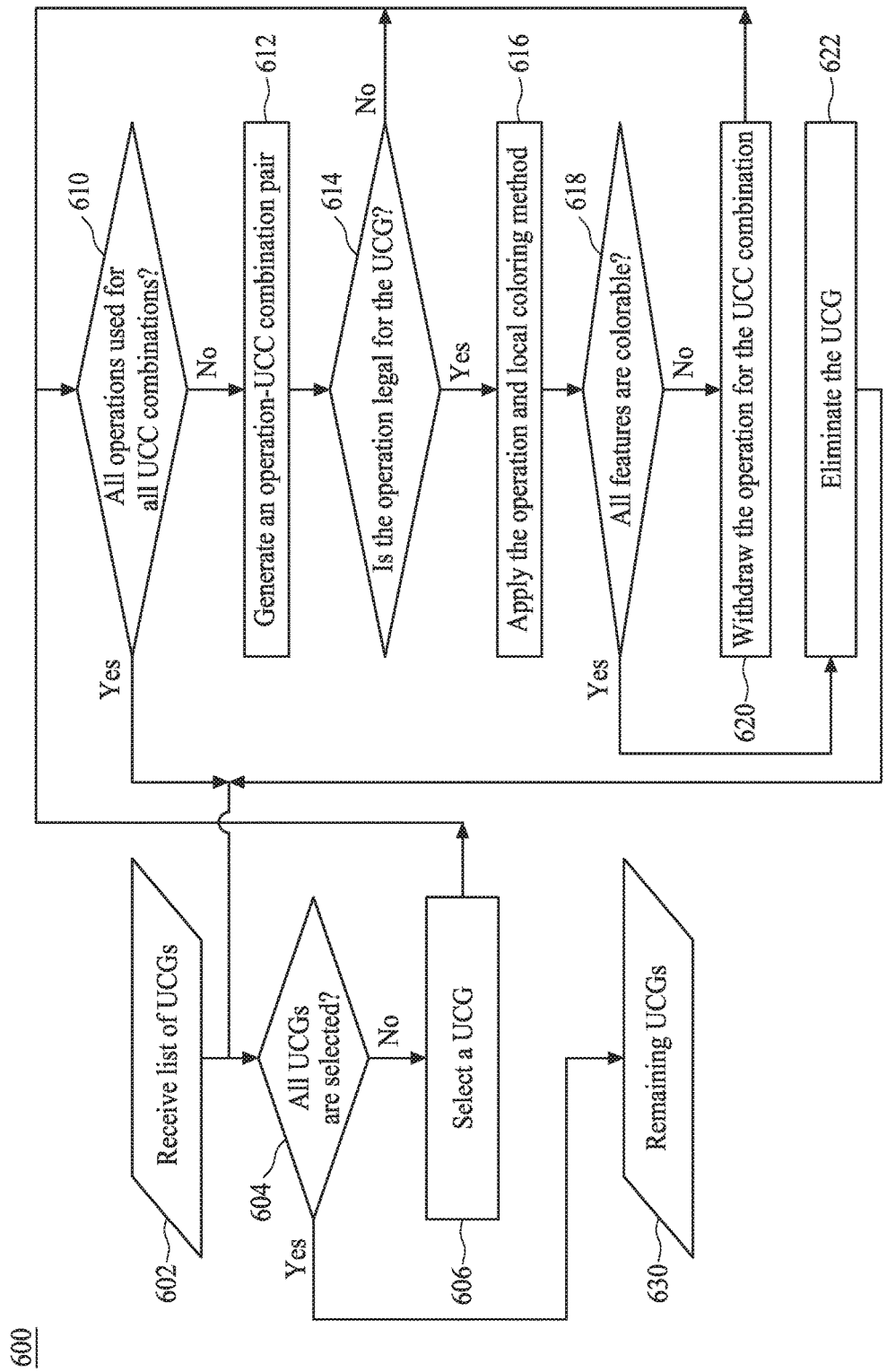
FIG. 6 is a design flow of a local refinement operation, in accordance with some embodiments.

FIG. 6 is a design flow 600 of a local refinement operation of step 334 in FIG. 3, in accordance with some embodiments. At step 602, a list of UCGs is received.

At step 604, it is determined if all UCGs on the list have been selected and examined. If affirmative, the flow 600 proceeds to step 630 and feeds all remaining UCGs on the list to the subsequent step 336 in FIG. 3. Otherwise, the flow 600 proceeds with step 606 to select a UCG.

At step 610, it is determined if all operations for local refinement have been used for all UCC combinations. If affirmative, the flow 600 returns to step 604 to select another UCG. If it is determined that not all the refinement operations have been used for all UCC combinations, the flow 600 proceeds with step 612 to select an unused refinement operation and an unselected UCC combination to form an operation-UCC combination pair. All of the operation-UCC combination pairs would be examined during the step 612 in an iterated manner. The local refinement operations may be conducted on a cellular base. Moreover, one or more cells may be involved in such cell-based refinement operations. A cell-based refinement operation is formed by one or more cell movements, such as cell flipping, cell shifting, or cell swapping, which are described with reference to FIGS. 7A through 7D.

At step 614, it is determined if the selected refinement operation is legal or applicable for the selected UCG with respect to a certain operation-UCC combination pair. Some examples are provided in FIGS. 7A through 7D to illustrate a refinement operation that is composed of one or more cell movements and is applicable for the selected UCG. If the determination result of step 614 is affirmative, then the selected refinement operation can be applied to the selected UCG, i.e., the selected UCC combination. In an embodiment, such examination covers multiple rows and multiple layers of the selected UCG. The flow 600 thus applies the legal refinement operation to refine the layout and performs layout coloring on the selected UCG at step 616. If the selected refinement operation is nevertheless illegal, no cell refinement will be performed and the flow 600 loops back to step 610 to assess another refinement operation.

At step 618, the flow 600 determines if all features (circuit patterns) in the selected and colored UCG are colorable. The determination is conducted through examining the separation distances of circuit patterns of the selected UCG and the separation distances between the UCG and its neighbor cells. A refinement operation may turn a circuit pattern, which is not in the UCG and was found legal before the refinement operation, into illegal circuit patterns due to the cell movements. Thus, it is necessary to confirm that the features are all colorable through the refinement operation. In an embodiment, such examination covers each row and layer of the selected UCG. If affirmative, the flow 600 proceeds with step 622 in which the UCG is eliminated from the UCG list. However, if the colored UCG or other cells in the layout still fail the coloring criterion, the flow 600 will withdraw from the current refinement operation at step 612 (i.e., recover the layout back to its previous status), and loop back to step 610.

Figure 7A:
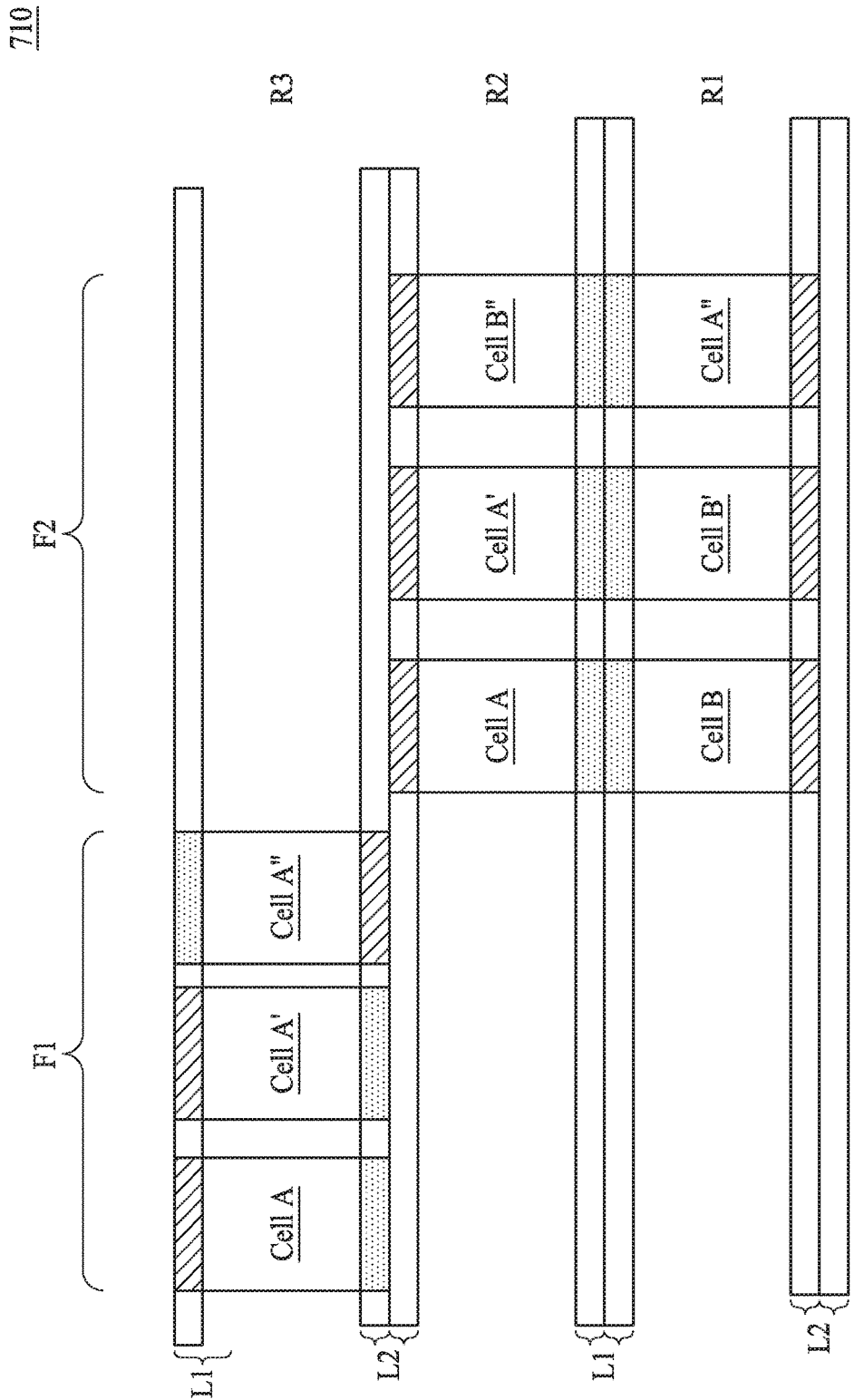
FIGS. 7A through 7C are schematic diagrams of cell movements, in accordance with some embodiments.
Figure 7B:
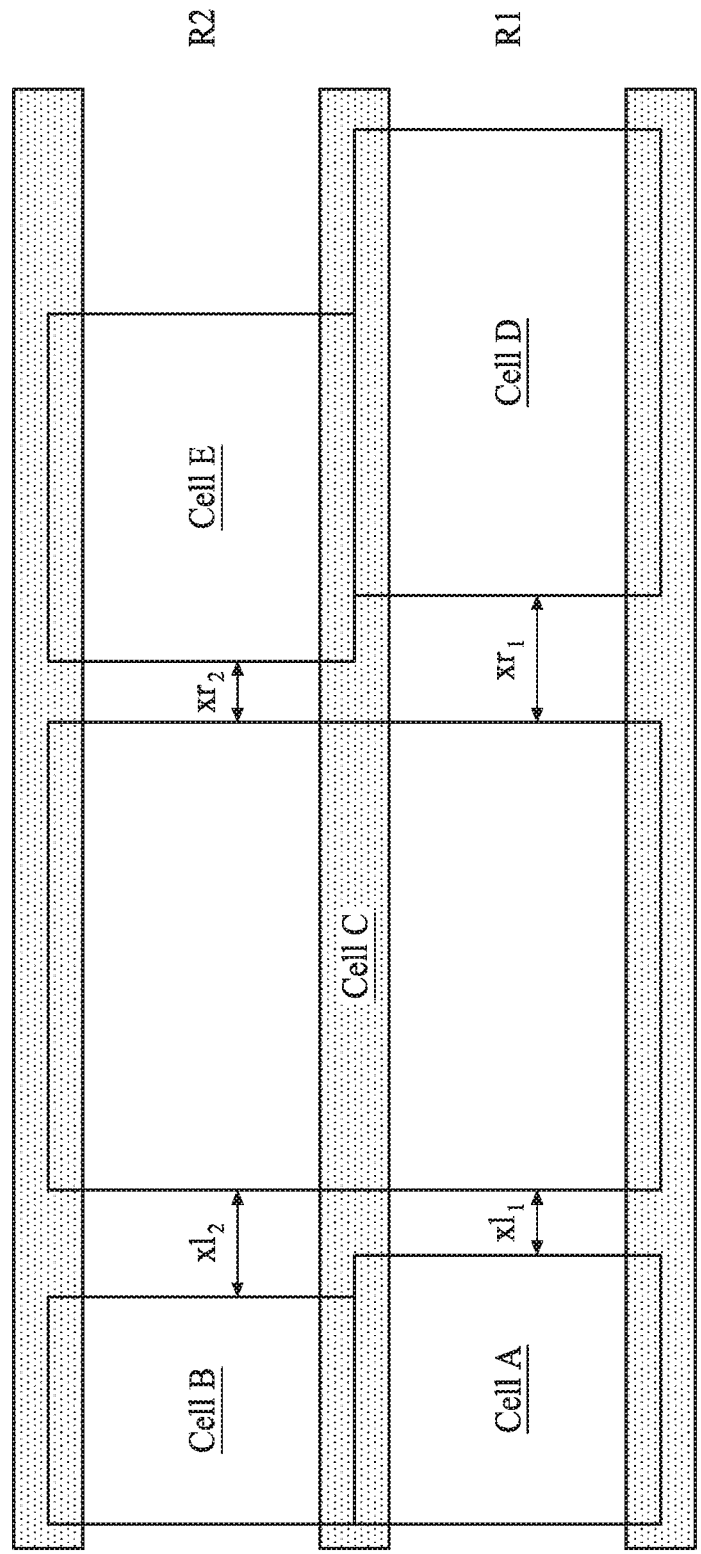
Figure 7C:
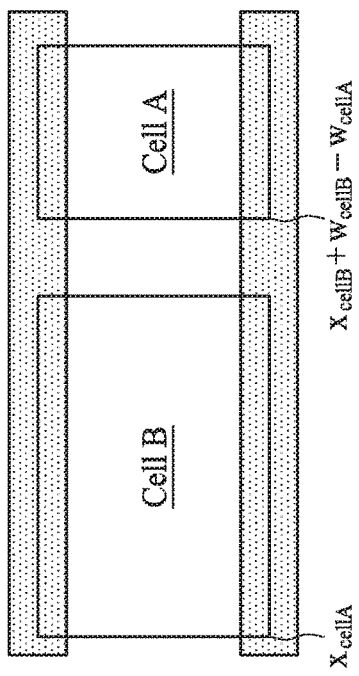

FIGS. 7A through 7C are schematic diagrams of cell movements, in accordance with some embodiments. The cell movements may include cell flipping, cell shifting, cell swapping, and the like. Referring to FIG. 7A, examples of a cell flipping movement are illustrated in a layout 710. The layout 710 includes three rows R1, R2 and R3. Each row R0 through R3 includes a top rail and a bottom rail, where the top rail may be a power rail L1 and the bottom rail may be a ground rail L2, or vice versa. In an embodiment, power/ground rails of a same type (L1 or L2) in neighboring rows are configured to abut each other. For example, the power rail L1 of row R2 abuts the power rail L1 of row R1, and the ground rail L2 of row R2 abuts the ground rail L2 of row R3.

A cell flipping may be performed on a basis of a single cell or a group of contiguous cells. A cell flipping may change the pattern separation distance between the cell (or cells) and neighboring cells by changing its own orientations. In an embodiment, a cell flipping is deemed legal or applicable for a selected cell or cells if the power/ground rails of flipped cell(s) are compatible with the original rail arrangement of the layout 710. For example, in a flipping F1, a cell A in row R3 is selected. Cell A may be flipped horizontally or vertically. In a horizontal cell flipping, cell A may be flipped as a cell A' at the same site. The horizontal flipping of cell A causes the flipped cell A' to occupy its original site, rather than moving to its neighboring cell site in the same row. In a vertical cell flipping, a flipped cell A" is flipped upside-down on the same site. The power/ground rails of flipped cell A" may not be compatible with the layout 710 due to incompatible power/ground rail configurations. In case cell A is not allowed to move to a legal row such as R2, such flipping movement alone is deemed illegal. In such situation, other movements may be considered to further rearrange cell A" to bring it to a legal status.

In a second flipping movement F2, a flipping group of cell A in row R2 and a cell B in row R1 is formed in a same flipping. The flipping movement F2 may be done horizontally (e.g., the group of cells A' and B') or vertically (e.g., the group of cells A" and B"). Similarly, more cells can be grouped in a flipping movement.

Referring to FIG. 7B, examples of a cell shifting movement are illustrated in a layout 720. The layout 720 includes two rows R1 and R2 in which five exemplary cells including cell A through cell E are disposed. Cells A through D have a cell height of single row height. Cell E is laid across rows R1 and R2 and has a cell height of double row height. In the original layout 720, cell E may violate the minimum separation distance rule with respect to one of cells A through D. A cell shifting movement causes a cell to move in the same row(s) to adjust the distance among the cells. For example, a cell shifting movement is performed on cell E to shift cell E to the left or to the right in a direction along which row R1 extends. A cell shifting movement is deemed illegal only if it falls below the range of allowable shift distance. For example, cell E is allowed to move closer to cell A or cell E along row R1 a by a respective maximal distance xl1 or xr1. The distance may be given by actual pattern dimensions or a number based on a default shift unit (e.g., micrometer). In the meantime, cell E is allowed to move closer to cell B or cell C along row R2 by a respective maximal distance xl2 or xr2. A minimal value of [xl1, xl2] is determined and regarded legal in a left-shifting movement. Similarly, a minimal value of [xr1, xr2] is determined and regarded legal in a right-shifting movement. Although not illustrated in FIG. 7B, a cell shifting movement allows a cell to shift to another row, i.e., shifting upwardly or downwardly. In the case of cell shifting between different rows, the shifting distance is set as a multiple of row height to ensure the cell is relocated within a row.

Referring to FIG. 7C, examples of a cell swapping movement are illustrated in a layout 730. The layout 730 includes a single row in which two exemplary cells including cell A and cell B are disposed. Other types of cell swapping across different rows are also possible. A cell shifting movement is performed such that the occupied locations of cells prior to the swapping are substantially the same as the locations of cells subsequent to the swapping. As such, reference coordinates and geometries of each cell involved in the cell swapping are provided to determine the new locations of the swapped cells. For example, in a horizontal cell swapping movement, cell widths W_cellA and W_cellB and coordinates of respective lower left corners X_cellA and X_cellB are provided. During a horizontal cell swapping movement, cell B is swapped with cell A in which cell B is relocated to the reference coordinate X_cellA, and cell A is relocated where its new lower left corner is set from X_cellA to X_cellB+W_cellB-W_cellA.

Figure 7D:
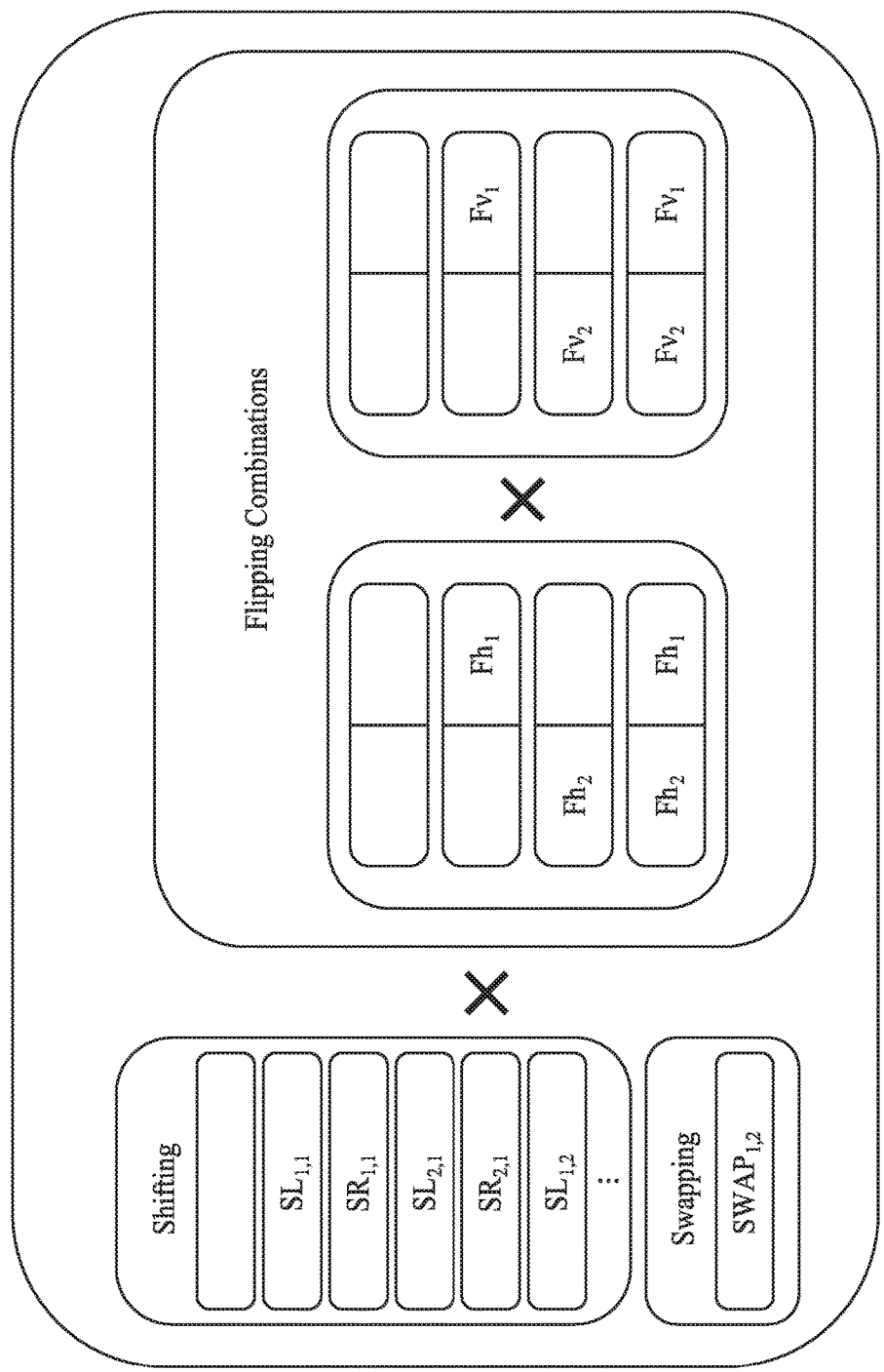
FIG. 7D is a schematic diagram representing combinations of cell movements, in accordance with some embodiments.

FIG. 7D is a schematic diagram representing combinations of cell movements, in accordance with some embodiments. A UCG of two uncolorable cells are taken as example. In a subplot of the cell shifting movement, formula SLi,j signifies a left shifting of cell i by j shift units, formula SRi,j signifies a right shifting of cell i by j shift units. In a subplot of the cell swapping movement, formula SWAPi,j signifies a swapping movement between cell i and cell j. In a subplot of cell flipping movement, formula Fv1 signifies a vertical flipping movement, and formula Fhi signifies a horizontal flipping movement for cell i. In an embodiment, different cell movements may be combined to achieve a desired operation in steps 610 and 612. Also, one or more of the above-mentioned movements can be used to form an operation. In an embodiment, a cell movement alone may not be deemed legal for a UCG, but may be found legal after being combined with other cell movements. For example, cell 1 and cell 2 may be refined by a combined operation which sequentially performs a shifting movement (represented by formula SLi,j) and swaps cell 1 and cell 2, followed by flipping at least one of the cell 1 and cell 2.

Figure 8:
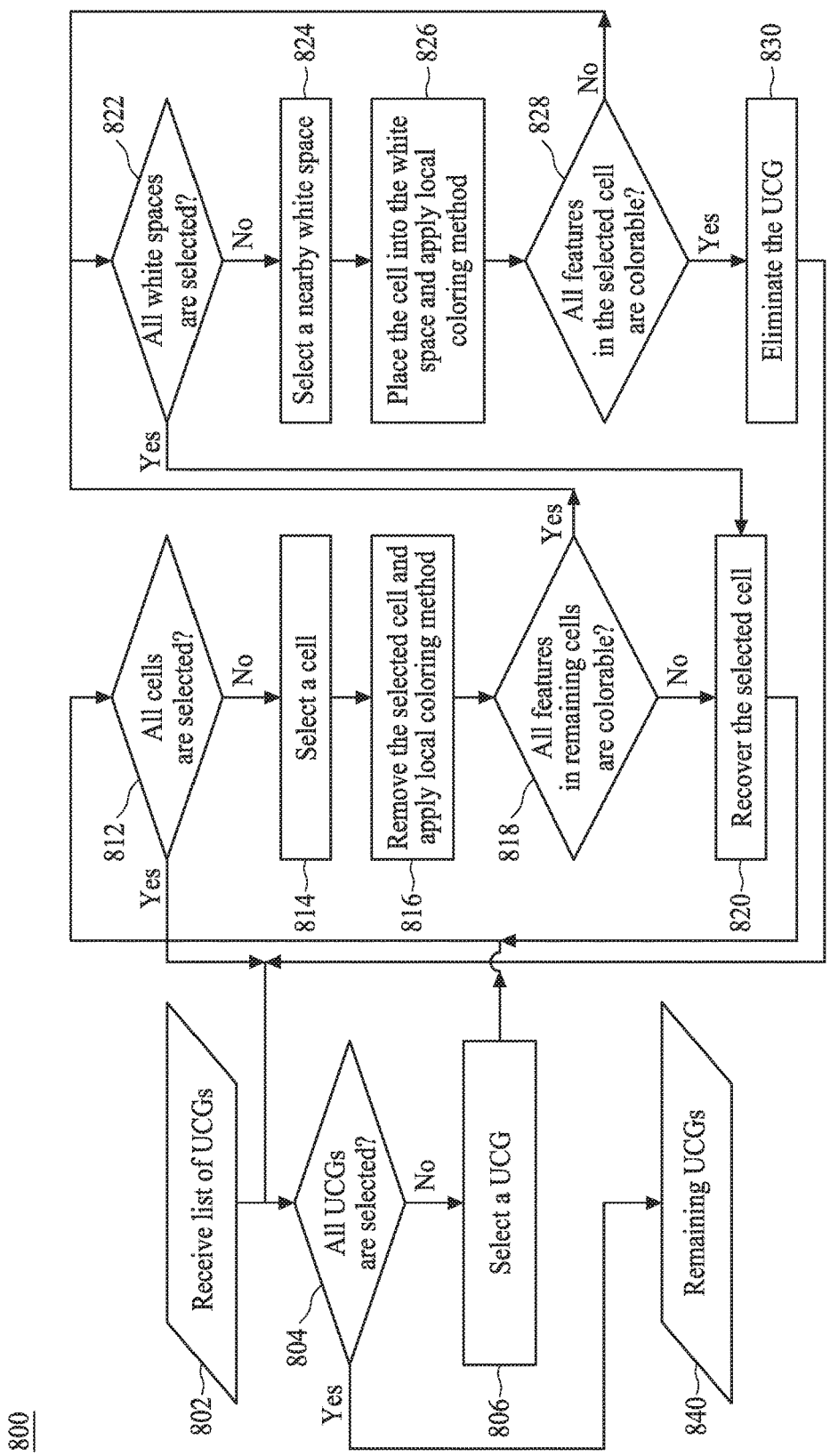
FIG. 8 is a design flow of a global refinement operation, in accordance with some embodiments.

FIG. 8 is a design flow 800 of a global refinement operation of step 336 in FIG. 3, in accordance with some embodiments. At step 802, a list of UCGs is received. In an embodiment, the list is fed from step 630 of FIG. 6.

At step 804, it is determined if all UCGs on the list have been selected and examined. If affirmative, the flow 800 proceeds to step 840 and feeds all remaining UCGs on the list to the subsequent step 338 in FIG. 3. Otherwise, the flow 800 proceeds with step 806 to select a UCG.

At step 812, it is determined if all cells in the selected UCG have been selected and examined. If affirmative, the flow 800 returns to step 804 to select another UCG. If it is determined not all cells have been are examined, the flow 800 proceeds with step 814 to select an unselected cell. In an embodiment, the cells are selected according to one or more selection criterion, such as the cell size. In an embodiment, a cell with a smaller cell size may be selected with priority over other larger cells. At step 816, the selected cell is removed from the UCG. A coloring operation is performed on the UCG devoid of the removed cell.

At step 818, it is determined whether all of the remaining features (i.e., circuit patterns) in the colored UCG are colorable. In an embodiment, such examination covers each row and layer of the colored UCG. If it is determined that the remaining circuit patterns still fails the coloring requirement, the flow 800 proceeds with step 820 in which the selected cell is recovered. That means the attempt to refine the selected UCG by reallocating such cell is deemed unsuccessful. The flow 800 subsequently returns back to step 812 for examining another unselected cell.

If it is determined that, by removing the selected cell from the UCG, the remaining circuit patterns of the UCG are all colorable, then the flow 800 proceeds onwards to relocate the selected cell. In an embodiment, the selected cell is relocated external to the UCG, such as a white space on the layout. A white space may refer to a spared region on the layout which is regarded eligible for use yet is not occupied by any other circuit pattern. At step 822, it is determined if all white spaces are used or occupied. If it is determined that all white spaces are used such that no white space is available that can accommodate the selected cell, the flow 800 loops back to step 820 and recovers the selected cell to the UCG. As such, the global refinement with reallocating the selected cell is deemed unsuccessful and the flow 800 subsequently returns to step 812 to select another unexamined cell.

If it is determined that at least one white space is available for the selected cell, the flow 800 proceeds with step 824 to select a white space for the selected cell. In an embodiment, the white space is selected as being closest to the UCG among available white spaces. In an embodiment, another white space may be preferred due to other considerations, such as having a smaller interference as compared to the closest white space. At step 826, a modified layout is formed in which the selected cell is placed into the preferred whitespace. A local coloring operation is performed on the layout in which only a neighborhood of the relocated cell is re-colored since the remaining portions of the modified layout have been checked and are considered colorable.

At step 828, it is determined whether all features around the selected cell are colorable. In an embodiment, such examination covers each row and layer of the selected cell. If affirmative, the selected UCG is eliminated from the list at step 830. The flow 800 returns to step 804 for examining another UCG. Otherwise, if the relocated cell is still deemed uncolorable, the global refinement with reallocating the selected cell is deemed unsuccessful and the flow 800 subsequently returns to step 812 to examine another unselected cell.

Figure 9:
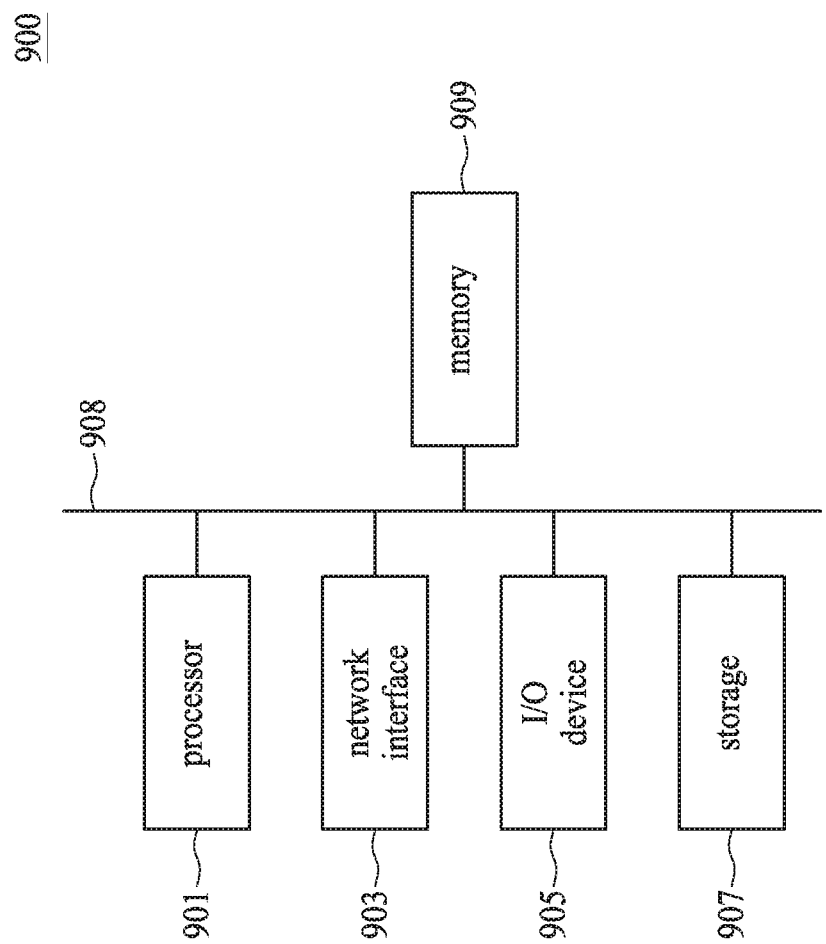
FIG. 9 is a schematic diagram of a system implementing layout designs, in accordance with some embodiments.

FIG. 9 is a schematic diagram of a system 900 implementing layout designs, in accordance with some embodiments. The system 900 includes a processor 901, a network interface 903, an input and output (I/O) device 905, a storage 907, a memory 909, and a bus 908. The bus 908 couples the network interface 903, the I/O device 905, the storage 907, the memory 909 and the processor 901 to each other.

The processor 901 is configured to execute program instructions that include a tool configured to perform the method as described and illustrated with reference to figures of the present disclosure. Accordingly, the tool is configured to execute the steps such as: provide design specifications, generate a netlist of a circuit, perform pre-layout simulation, generate an initial layout, perform local or global layout refinement, perform layout coloring, perform LVS, generate a consolidated netlist by incorporating the parameters, perform post-layout simulation and verify the post-layout simulation result.

The network interface 903 is configured to access program instructions and data accessed by the program instructions stored remotely through a network (not shown).

The I/O device 905 includes an input device and an output device configured for enabling user interaction with the system 70. In some embodiments, the input device comprises, for example, a keyboard, a mouse, and other devices. Moreover, the output device comprises, for example, a display, a printer, and other devices.

The storage device 907 is configured for storing program instructions and data accessed by the program instructions. In some embodiments, the storage device 907 comprises a non-transitory computer readable storage medium, for example, a magnetic disk and an optical disk.

The memory 909 is configured to store program instructions to be executed by the processor 901 and data accessed by the program instructions. In some embodiments, the memory 909 comprises any combination of a random access memory (RAM), some other volatile storage device, a read only memory (ROM), and some other non-volatile storage device.

The proposed layout refinement is advantageous in several aspects. Firstly, the proposed coloring operation is performed based on a unit of UCG. Further, the layout refinement operation, including either the local refinement operation of step 334 or the global refinement operation of step 336, may take into account a UCG across multiple rows and/or multiple layers. The proposed schemed is designed to pursue a minimal cell displacement during the layout refinement operation. Thus, through the UCG-based coloring operation of the present disclosure, the number of UCGs is monotonically decreased in each refinement round. That is because all of the UCGs are exhausted during the local refinement and the global refinement operation. Further, it is required that each UCG is allowed to be eliminated only when no new coloring conflicts would be introduced.

Existing layout coloring approaches may be performed row by row or layer by layer. However, a ping-pong effect may occur in which, once a first row/layer of a cell is refined and found colorable, a refined second row/layer found uncolorable might case the first row/layer to be uncolorable again. In contrast, the proposed scheme takes UCCs from different rows and layers into account. Thus, the solution converges more quickly and the chances of ping-pong effects may be reduced. Additionally, the proposed scheme is capable of dealing with cells with different cell heights across multiple rows in a same round of refinement. The solution space would be increased effectively while the computational burden can be kept competitive.

Moreover, the proposed scheme is performed without incorporation of stitch-based approaches since the coloring conflict is resolved through changing the relative positions of the cell (e.g., through cell movements), rather than recrafting any circuit pattern (e.g., through dividing the circuit pattern into sub-patterns) in the cell.

According to an embodiment, a method performed by at least one processor includes: accessing a layout of an integrated circuit (IC), where the layout includes a plurality of patterns in one or more layers of the layout; performing a coloring operation; forming a list comprising at least one uncolorable cell group (UCG) of the layout based on a result of the coloring operation, where each of the at least one UCG comprises at least one uncolorable cell; and performing a first refinement for each UCG on the list. The first refinement is performed through: performing a movement on at least one uncolorable cell of the UCG; determining whether the UCG is colorable; and refining the layout by accepting the movement and removing the UCG from the list in response to the UCG being determined to be colorable.

According to an embodiment, a system, comprising one or more processors and one or more programs including instructions which, when executed by the one or more processors, cause the system to: access a layout of an integrated circuit (IC), where the layout includes a plurality of patterns in one or more layers of the layout; perform a coloring operation; form a list comprising at least one uncolorable cell group (UCG) of the layout based on a result of the coloring operation, wherein each of the at least one UCG comprises at least one uncolorable cell; and perform a first refinement for each UCG on the list. The first refinement is performed through: performing a movement on at least one uncolorable cell of the UCG; determining whether the UCG is colorable; and refining the layout by accepting the movement and removing the UCG from the list in response to the UCG being determined to be colorable.

According to an embodiment, a non-transitory computer readable storage medium, comprising instructions which, when executed by a processor, performs the steps of: accessing a layout of an integrated circuit (IC), where the layout includes a plurality of patterns in one or more layers of the layout; performing a coloring operation; forming a list comprising at least one uncolorable cell group (UCG) of the layout based on a result of the coloring operation, wherein each of the at least one UCG comprises at least one uncolorable cell; and performing a first refinement for each UCG on the list. The first refinement is performed through: performing a movement on at least one uncolorable cell of the UCG; determining whether the UCG is colorable; and refining the layout by accepting the movement and removing the UCG from the list in response to the UCG being determined to be colorable.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, performed by at least one processor, comprising:
    accessing a layout of an integrated circuit (IC), the layout comprising a plurality of patterns in one or more layers of the layout;
    performing a coloring operation;
    forming a list comprising at least one uncolorable cell group (UCG) of the layout based on a result of the coloring operation, wherein each of the at least one UCG comprises at least one uncolorable cell;
    performing a first refinement for each UCG on the list, comprising:
        performing a movement on at least one uncolorable cell of the UCG;
        determining whether the UCG is colorable; and refining the layout by accepting the movement and removing the UCG from the list in response to the UCG being determined to be colorable; and performing a second refinement for each UCG left on the list subsequent to performing the first refinement, comprising:
  selecting a UCG;
  for each selected UCG,
    selecting a cell of the selected UCG;
    relocating the selected cell of the selected UCG to a white space of the layout; and
    refining the layout by accepting the relocating and removing the UCG from the list in response to the selected cell and selected UCG excluding the removed cell being determined to be colorable.

2. The method according to claim 1, further comprising performing a post-layout simulation based on the refined layout and manufacturing the IC in response to the post-layout simulation being successful.

3. The method according to claim 1, wherein the movement comprises at least one of a cell flipping operation, a cell shifting operation, and a cell swapping operation.

4. The method according to claim 1, wherein performing a coloring operation comprises generating a graph for the layout, the graph comprising nodes representing the plurality of patterns of each layer, and performing a coloring operation on the graph.

5. The method according to claim 1, wherein forming a list comprising at least one UCG of the layout comprises identifying at least one UCG composed of uncolorable cells with different cell heights.

6. The method according to claim 1, wherein forming a list comprising at least one UCG of the layout comprises identifying at least one UCG composed of uncolorable cells across different layers of the layout.

7. The method according to claim 1, wherein relocating the selected cell of the selected UCG to a white space of the layout comprises:
  removing the selected cell from the selected UCG; and
  relocating the cell to the white space in response to the selected UCG excluding the removed cell being determined to be colorable.

8. The method according to claim 1, wherein performing a first refinement for each UCG on the list further comprises withdrawing the movement of the at least one uncolorable cell in response to the UCG, for which the cell is moved, being determined to be uncolorable.

9. A system, comprising one or more processors and one or more programs including instructions which, when executed by the one or more processors, cause the system to:
  access a layout of an integrated circuit (IC), the layout comprising a plurality of patterns in one or more layers of the layout;
  perform a coloring operation;
  form a list comprising at least one uncolorable cell group (UCG) of the layout based on a result of the coloring operation, wherein each of the at least one UCG comprises at least one uncolorable cell; and
  perform a first refinement for each UCG on the list, comprising:
    performing a movement on at least one uncolorable cell of the UCG;
    determining whether the UCG is colorable;
    refining the layout by accepting the movement and removing the UCG from the list in response to the UCG being determined to be colorable, and
    withdrawing the movement of the at least one uncolorable cell in response to the UCG, for which the cell is moved, being determined to be uncolorable.

10. The system according to claim 9, wherein forming a list comprising at least one UCG of the layout comprises identifying at least one UCG composed of uncolorable cells across different rows of the layout.

11. The system according to claim 9, wherein the movement comprises a combination of at least two elements of a group composed of a cell flipping operation, a cell shifting operation, and a cell swapping operation.

12. The system according to claim 9, wherein forming a list comprising at least one UCG of the layout comprises identifying at least one UCG composed of uncolorable cells with different cell heights.

13. The system according to claim 9, wherein forming a list comprising at least one UCG of the layout comprises identifying at least one UCG composed of uncolorable cells across different layers of the layout.

14. The system according to claim 9, further comprising performing a second refinement for each UCG left on the list subsequent to performing the first refinement.

15. The system according to claim 14, wherein the second refinement comprises:
  selecting a UCG;
  for each selected UCG,
    selecting a cell of the selected UCG;
    relocating the selected cell of the selected UCG to a white space of the layout; and
    refining the layout by accepting the relocating and removing the UCG from the list in response to the selected cell and the selected UCG excluding the removed cell being determined to be colorable.

16. The system according to claim 15, wherein relocating the selected cell of the selected UCG to a white space of the layout comprises:
  removing the selected cell from the selected UCG; and
  relocating the cell to the white space in response to the selected UCG excluding the removed cell being determined to be colorable.

17. A non-transitory computer readable storage medium, comprising instructions which, when executed by a processor, performs the steps of:
  accessing a layout of an integrated circuit (IC), the layout comprising a plurality of patterns in one or more layers of the layout;
  performing a coloring operation;
  forming a list comprising at least one uncolorable cell group (UCG) of the layout based on a result of the coloring operation, wherein each of the at least one UCG comprises at least one uncolorable cell; and
  performing a first refinement for each UCG on the list, comprising:
    performing a movement on at least one uncolorable cell of the UCG;
    determining whether the UCG is colorable;
    refining the layout by accepting the movement and removing the UCG from the list in response to the UCG being determined to be colorable; and
  performing a second refinement for each UCG left on the list subsequent to performing the first refinement, comprising:
    selecting a UCG;
    for each selected UCG,
      selecting a cell of the selected UCG;
      relocating the selected cell of the selected UCG to a white space of the layout; and refining the layout by accepting the relocating and removing the UCG from the list in response to the selected cell and selected UCG excluding the removed cell being determined to be colorable.

18. The non-transitory computer readable storage medium according to claim 17, wherein forming a list comprising at least one UCG of the layout comprises identifying at least one UCG composed of uncolorable cells across different layers of the layout.

19. The non-transitory computer readable storage medium according to claim 17, wherein the movement comprises at least one of a cell flipping operation, a cell shifting operation, and a cell swapping operation.

20. The non-transitory computer readable storage medium according to claim 17, wherein performing a first refinement for each UCG on the list further comprises withdrawing the movement of the at least one uncolorable cell in response to the UCG, for which the cell is moved, being determined to be uncolorable.

* * * * *